United States Patent Office 2,799,527
Patented July 16, 1957

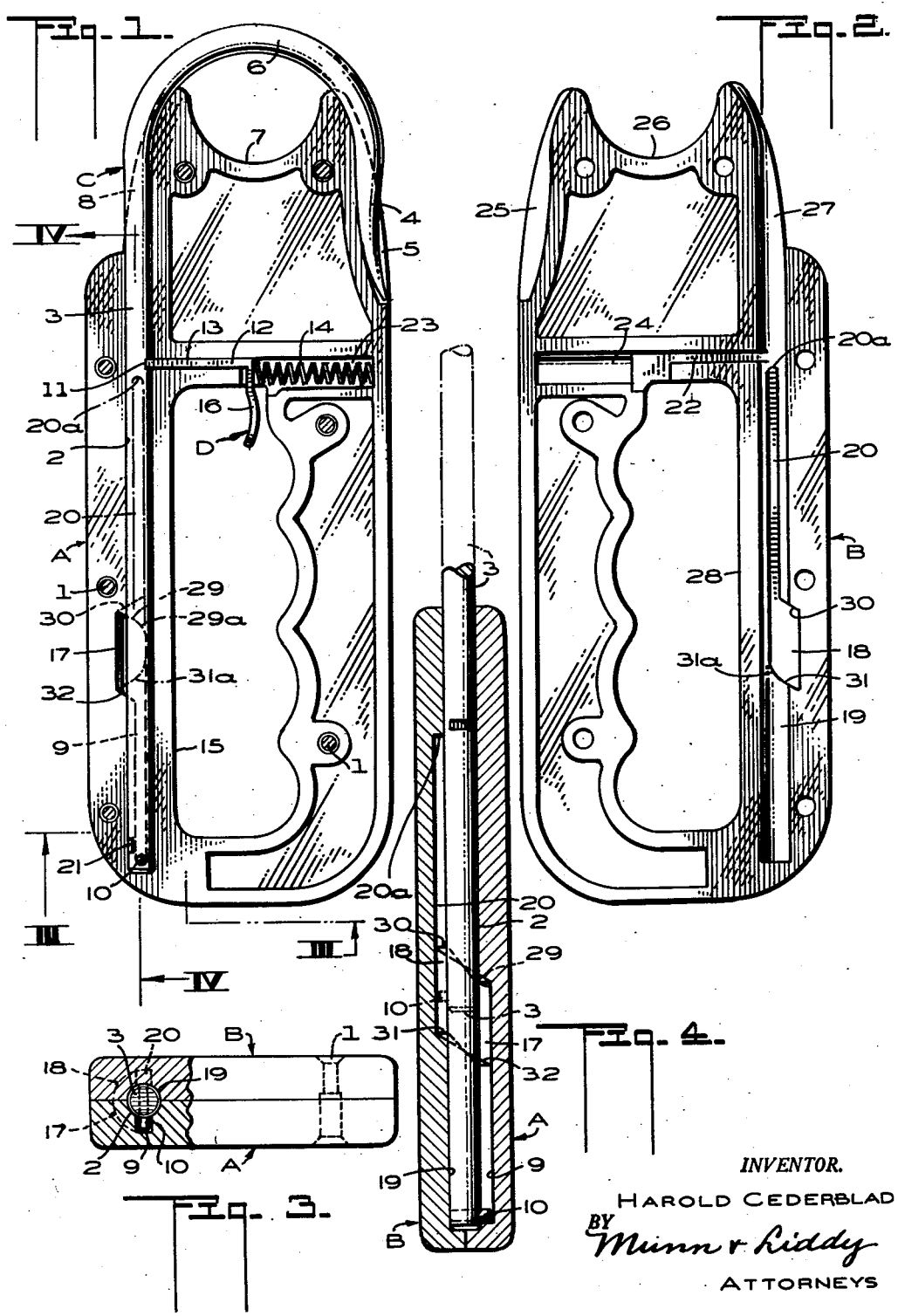

2,799,527

FISH GAFF

Harold Cederblad, San Francisco, Calif.

Application April 8, 1954, Serial No. 421,809

4 Claims. (Cl. 294—26)

An object of my invention is to provide a fish gaff which is an improvement over the retractable safety fish gaff shown in my Patent No. 2,536,535, issued January 2, 1951. In the patented device the handle for the fish gaff shank is formed from two halves and is provided with a bore for slidably receiving the shank. An enlarged end of the shank has a shoulder that acts as a stop for limiting the outward movement of the shank after the latter has reached its operative position. The shank-receiving bore in the handle has a reduced upper end that forms a shoulder which cooperates with the shank shoulder for stopping further outward movement when the fish gaff reaches operative position. No means is shown in the patent for aiding in positioning the gaff hook when in extended position so that the hook-shaped portion of the gaff will point in a direction 180° from that which the hook assumes when the gaff is in inoperative position.

The principal object of the present invention is to provide a fish gaff in which novel means is used for holding the hook-shaped portion of the gaff in a position where it can be received in a hook-receiving groove provided in the handle when the gaff is moved into retracted position. The means that holds the hook-shaped end in one position as the gaff is moved into retracted or inoperative position, performs the additional function of acting as an indicator for initially swinging the hook in the required rotative direction as the operator pulls the gaff toward operative position. The means permits the operator to continue swinging the hook in this same rotative direction until it has reached a position 180° from its starting point without the need of the gaff shank moving longitudinally. This same means is then used for holding the hook-shaped portion from swinging about the longitudinal axis of the shank as a pivot when the gaff is in extended or operative position.

A trigger is used for holding the gaff either in inoperative position where it is protected by the handle, or in operative position, where the hook portion faces away from the handle. The same hook guide means already mentioned, serves the additional function of acting as a stop when the gaff is in extended position. The handle has a stop that contacts with the hook guide means when the gaff is in inoperative position. Therefore, the trigger serves only to prevent the accidental retraction of the fish gaff shank within the handle.

A further object of my invention is to provide a device of the type described which is simple in construction and durable and efficient for the purpose intended.

Other objects and advantages will appear in the following specification, and the novel features of the device will be particularly pointed out in the appended claims.

My invention is illustrated in the accompanying drawing forming a part of this application, in which:

Figure 1 shows an inside view of one-half of the fish gaff handle and illustrates the fish gaff hook and shank in retracted position;

Figure 2 shows an inside view of the other half of the handle;

Figure 3 is a transverse section taken long the line III—III of Figure 1; and

Figure 4 is a longitudinal section taken along the line IV—IV of Figure 1 and illustrates the shape of the gaff-shank receiving bore and the positions of the grooves associated therewith.

While I have shown only the preferred form of my invention, it should be understood that various changes or modifications may be made within the scope of the appended claims without departing from the spirit and scope of the invention.

In carrying out my invention, I provide a fish gaff handle composed of two halves or parts, the interior of the part A being shown in Figure 1 and the interior of the part B being shown in Figure 2. In actual practice the two parts A and B can be secured together as shown in Figure 3 by any suitable fastening means, such as screws 1, to form the complete handle. It is possible to secure the two parts A and B permanently to each other by adhesive, not shown. A detailed description of the part A will be given first and this will be followed by a detailed description of the part B.

The part A has a half bore 2 therein that extends along the length of the part and is designed to rotatably and slidably receive a shank 3 of a fish gaff hook C, as illustrated in Figure 1. The fish gaff hook C is illustrated in retracted or inoperative position. The pointed end 4 of the hook is received in a half-groove 5 provided near one end of the part A. The curved portion 6 of the hook is spaced from a recessed end 7 in the part A in the same manner as shown in my patent. The part A also has another curved half-grooved portion 8 for receiving the portion of the hook 6 that merges into the shank 3.

The handle part A has a groove 9 that communicates with the lower end of the half-bore 2 and the length of this groove is clearly shown in Figure 4, while its width and depth are illustrated in full lines in Figure 3. Adjacent to the lower end of the gaff shank 3, I mount a pin 10 that extends transversely from only one side of the shank and this pin rides in the groove 9 when the fish gaff hook is in retracted position. The groove 9 prevents rotation of the shank 3 when the pin 10 is received in the groove and therefore the pointed end 4 of the fish gaff hook will be aligned and received in the half-groove 5 in the part A.

I provide novel means for initially indicating the direction in which the curved portion 6 of the fish gaff hook must be rotated as the gaff is moved from retracted position into extended or operative position. When the shank 3 is in retracted position, a notch 11 provided in the shank will be aligned with a detent 12 of a release trigger mechanism indicated at D, see Figure 1. The detent 12 rides in a half-groove 13 and a spring 14 is received in a half-groove 23 and urges the free end of the detent into the notch 11 for holding the shank 3 in retracted position.

The part A of the handle has an opening 15 large enough to receive the operator's hand, and a finger piece 16 extends downwardly from the detent 12 of the release trigger and into the opening 15 so that the operator can actuate the finger piece for compressing the spring 14 and releasing the detent 12 from the notch 11 so that the shank 3 can be moved manually into extended position.

Although I show novel means for initially indicating to the operator the direction in which the curved portion 6 should be rotated, it is possible to rotate the hook 6 manually through an arc of 180° when the shank 3 has reached a predetermined point in its movement along the half-groove 2, without the shank needing to move longitudinally during the rotative movement. In Figure 4, I show the top of the groove 9 communicating with an enlarged cavity 17 formed in the part A. This cavity is preferably in the shape of a quarter cylinder as clearly shown by the curved dotted lines in Figure 3. When the pin 10 reaches this cavity, the shank and hook are free to swing through an arc of 90° within the cavity, with the shank axis acting as the line of pivot. I have indicated in dot dash lines in Figure 4 the position of the lower end of the shank 3 when the shank and hook are free to be rotated about the longitudinal axis of the shank for swinging the pin 10 in the cavity 17. In fact, Figure 4 illustrates the swinging of the shank 3 through 180° rather than 90° and the pin 10 will be received in another cavity 18 formed in the handle part B that cooperates with and forms an extension for the cavity 17. Reference to Figure 3 shows by a dotted arcuate line that the cavity 18 has an arcuate surface which is 90° in extent and is a continuation of the surface 17.

Still referring to Figure 2 and the handle part B, it will be noted that this part has a half bore 19 that faces the half bore 2 in the part A when the two parts are secured together and therefore the two half bores 2 and 19 will form the complete bore that slidably and rotatably receives the shank 3. Figure 2 also shows the cavity 18 communicating with a groove 20 that will receive the pin 10 when the shank has been rotated through an arc of 180° and the pin is in the dot dash line position shown in Figure 4. The top 20a of the groove 20 acts as a stop for the pin 10 when the fish gaff hook C is in fully extended position. When this position is reached, a second notch 21 in the shank 3 will be brought into registration with the detent 12 of the release trigger and therefore the detent will enter the notch and will hold the fish gaff hook in extended position with the hook 6 facing away from the handle. The pin 10 will prevent rotation of the hook about the shank 3 because it will be received in the groove 20. The drawing does not show the fish gaff in fully extended position.

In Figure 2 I show a half-groove 22 in the handle part B for cooperating with the half-groove 13 in the part A, the two half-grooves forming a bore and slidably receiving the detent of the release trigger mechanism D. The part A shown in Figure 1 has the recess 23 for receiving half of the spring 14 and the part B has a corresponding recess 24 for receiving the other half of the same spring. The handle part B also has a half-groove 25 that cooperates with the half-groove 5 of the handle part A to receive the pointed end of the fish gaff hook and protect it. The part B further has a recessed end 26 that corresponds to and cooperates with the recessed end 7 for forming a finger-receiving opening that permits the operator to engage with the curved hook portion 6 when he desires to move the fish gaff hook into extended position. It will also be seen that part B has a curved half-groove 27 that cooperates with the curved half-groove 8 in the part A, and the two half-grooves provide a curved groove for receiving the hook 6 when the fish gaff hook 3 is retracted. A hand-receiving opening 28 is provided in the part B and this is of the same shape as the hand-receiving opening 15 of the part A. When the two handle parts A and B are assembled, the two finger-receiving openings 15 and 28 will cooperate to provide a single hand-receiving opening in the gaff handle.

It is desirous to indicate the direction in which the hook must be rotated as it is moved from inoperative position into operative position. I accomplish this by forming an inclined surface 29 to the upper edge of the cavity 17 and when the hook portion 6 is grasped by the operator and is moved outwardly for guiding the shank 3 and pin 10 upwardly in the bore and groove 9 formed in the complete handle, the pin 10 will eventually move out from the groove 9 and will enter the cavity 17 and contact with the inclined edge 29 at the top of the cavity. The inclined edge 29 will tend to rotate the hook 6 in the right direction. In fact one side wall of the groove 9 forms a corresponding side wall for the cavity 17 and prevents the shank 3 from rotating in an opposite direction.

It should be noted that the operator can manually rotate the shank 3 the remaining distance of the 180° arc without the pin 10 continuing to contact with the inclined edge 29 and the inclined edge 30 of the cavity 18, see Figure 4. The inclined edge 30 is a continuation of the inclined edge 29 and the two form a continuous inclined edge for the top of the two pin-receiving cavities 17 and 18. The inclined edge 30 communicates with the groove 20 that is provided in the handle part B, see Figures 2 and 4. One side wall of the groove 20 extends on into the cavity 18 as shown in Figure 2 and forms a side wall of this cavity. Therefore the pin 10 cannot move through more than an arc of 180° and the pin will be guided into the groove 20 as the hook is pulled outwardly. When the pin reaches the top 20a of the groove 20, the fish gaff hook will be in fully extended position. At this time the notch 21 in the shank 3 will be in a position to receive the detent 12 of the trigger mechanism D. The detent will prevent the shank from retracting, but the end 20a of the groove 20 will take the force of any outward pull of the gaff when the gaff is used for holding a fish. Therefore, the detent 12 will be under no strain due to any outward pull on the shank 3.

After the fish gaff hook has been used and the operator wishes to return it to retracted position, he can release the detent 12 from the notch 21 and then move the shank 3 manually into the bore formed by the half bores 2 and 19 provided in the handle parts A and B, respectively. The pin 10 will ride along the groove 20 and then will enter the cavity 18, shown in Figure 4. I provide an inclined lower edge 31 for the cavity 18 and the pin will strike this edge and will indicate to the operator the direction of rotation through which the hook must be swung into its inoperative position. Again the shank can be manually rotated independently of the inclined edge 31 through an arc of 180° to move the pin 10 into the cavity 17 and align it with the groove 9. I show the cavity 17 provided with an inclined lower edge 32 that is a continuation of the inclined edge 31. The edge 32 terminates adjacent to the groove 9 and the pin is received in this groove as the shank is moved into its lowermost or retracted position. When this position is reached, the notch 11 will be in registration with the detent 12 so as to receive the latter, whereupon the shank is secured in closed or safety position.

It should be noted from Figure 2 that the inclined lower edge 31 for the cavity 18 has a curved portion at 31a so that the pin 10 will indicate more readily the turning movement through which the hook must be rotated. In like manner the upper edge 29 for the cavity 17 has a curved portion at 29a so that the pin 10 when reaching this curved portion will indicate to the operator the direction the hook must be rotated as it is being moved into extended position.

I claim:

1. In combination: a handle having a bore therein closed at one end; a gaff having a shank slidable in the bore and projecting beyond the open end of the bore; the projecting end of the shank having a hook; said handle having an enlarged cavity communicating with the bore and positioned between the closed and open ends of the bore; said handle also having a pin-receiving groove communicating with that portion of the bore lying between the closed end of the bore and the enlarged cavity; said handle further having a second pin-receiving groove disposed on the opposite side of the bore and communicating with that portion of the bore lying between the enlarged cavity and the open end of the bore; said second pin-receiving groove extending from the enlarged cavity to a spaced distance from the open end of the bore; and a pin carried by the gaff shank and being slidably receivable in the first groove when the gaff is in retracted position; the enlarged cavity having an inclined edge that will indicate the proper turning movement to be imparted to the shank when the pin strikes thereagainst after the hook has been pulled toward operative position and the pin has passed from the first groove into the enlarged cavity; said hook and shank being freely and manually rotatable in the same direction as indicated by the inclined edge and independently of said edge, when the pin is disposed in said cavity, and without the shank being forced to move longitudinally during this rotation movement for bringing the pin into registration with the second groove; whereby the hook and shank can be pulled into operative position.

2. The combination as set forth in claim 1; and in which one side wall of the first groove is extended into the enlarged cavity and forms a side wall for the cavity and prevents the hook and shank from being rotated in a direction which is opposite to that indicated when the pin strikes said inclined edge of the enlarged cavity.

3. In combination: a handle having a bore therein closed at one end; a gaff having a shank slidable in the bore and projecting beyond the open end of the bore; the projecting end of the shank having a hook; said handle having an enlarged cavity communicating with the bore and positioned between the closed and open ends of the bore; said handle also having a pin-receiving groove communicating with that portion of the bore lying between the enlarged cavity and the open end of the bore; said pin-receiving groove extending from the enlarged cavity to a spaced distance from the open end of the bore; said handle further having a second pin-receiving groove disposed on the opposite side of the bore and communicating with that portion of the bore lying between the enlarged cavity and the closed end of the bore; and a pin carried by the gaff shank and being slidably receivable in the first-mentioned groove when the gaff is in extended position and the hook faces away from the handle; the enlarged cavity having an inclined edge that will indicate the proper turning movement to be imparted to the shank when the pin strikes thereagainst after the hook is moved toward inoperative position and the pin has passed from the first-mentioned groove into the enlarged cavity; said hook and shank being freely and manually rotatable in the same direction as indicated by the inclined edge and independently of said edge, when the pin is disposed in said cavity, and without the shank being forced to move longitudinally during the rotative movement for bringing the pin into registration with the second-mentioned groove; whereby the hook and shank can be moved into inoperative position.

4. The combination as set forth in claim 3; and in which one side wall of the first-mentioned groove is extended into the enlarged cavity and forms a side wall for the cavity and prevents the hook and shank from being rotated in a direction which is opposite to that indicated when the pin strikes said inclined edge of the enlarged cavity.

References Cited in the file of this patent

UNITED STATES PATENTS

| | | |
|---|---|---|
| 1,278,100 | Brunning | Sept. 10, 1918 |
| 2,372,743 | Schofield | Apr. 3, 1945 |
| 2,536,535 | Cederblad | Jan. 2, 1951 |
| 2,570,538 | Fincher et al. | Oct. 9, 1951 |